(12) United States Patent
Asada (10) Patent No.: US 8,297,390 B2
(45) Date of Patent: Oct. 30, 2012

(54) VEHICULAR SYSTEM CAPABLE OF SUITABLY CONTROLLING ENGINE SPEED AND GEAR RATIO ACCORDING TO BATTERY CHARGE STATE

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 1050 days.

(21) Appl. No.: 12/078,628

(22) Filed: Apr. 2, 2008

(65) Prior Publication Data

US 2008/0246285 A1 Oct. 9, 2008

(30) Foreign Application Priority Data

Apr. 6, 2007 (JP) ................................ 2007-100082

(51) Int. Cl.
*B60W 10/00* (2006.01)
*B60W 20/00* (2006.01)
*B60W 10/06* (2006.01)
*B60W 10/08* (2006.01)
*B60W 10/10* (2012.01)

(52) U.S. Cl. ........... 180/65.275; 180/65.28; 180/65.285; 180/65.265

(58) Field of Classification Search ............... 180/65.21, 180/65.265, 65.275, 65.28, 65.285, 65.29; 701/22

See application file for complete search history.

(56) References Cited

U.S. PATENT DOCUMENTS

| | | | | |
|---|---|---|---|---|
| 5,846,155 A | * | 12/1998 | Taniguchi et al. | 477/2 |
| 5,935,040 A | * | 8/1999 | Tabata et al. | 477/3 |
| 5,979,257 A | * | 11/1999 | Lawrie | 74/335 |
| 6,116,368 A | * | 9/2000 | Lyons et al. | 180/165 |
| 6,278,915 B1 | * | 8/2001 | Deguchi et al. | 701/22 |
| 6,452,286 B1 | * | 9/2002 | Kubo et al. | 290/40 C |
| 6,459,980 B1 | * | 10/2002 | Tabata et al. | 701/70 |
| 6,617,703 B2 | * | 9/2003 | Matsubara et al. | 290/40 C |
| 6,625,534 B2 | * | 9/2003 | Suzuki et al. | 701/62 |

(Continued)

FOREIGN PATENT DOCUMENTS

JP A-62-275849 11/1987

(Continued)

OTHER PUBLICATIONS

English language version of Office Action issued in corresponding Japanese Patent Application No. 2007-100082, mailed Feb. 24, 2009.

*Primary Examiner* — J. Allen Shriver, II
*Assistant Examiner* — Travis Coolman
(74) *Attorney, Agent, or Firm* — Oliff & Berridge, PLC (57) ABSTRACT

A vehicular system includes a battery, an engine, an electric generator that is driven by the engine to generate electric power and thereby charge the battery, a first control apparatus that controls the battery and electric generator, a drive shaft, a CVT that transmits rotation of the engine to the drive shaft, and a second control apparatus that controls the engine and CVT. Further, the first control apparatus is configured to: (1) detect charge/discharge current of the battery; (2) monitor the SOC of the battery; (3) inform, when there is a decrease in the SOC of the battery, the second control apparatus of the decrease in the SOC; (4) set a target charge current of the battery for recovering the decreased SOC; and (5) control the electric generator to increase the amount of the electric power, thereby supplying the battery with the target charge current.

2 Claims, 5 Drawing Sheets

U.S. PATENT DOCUMENTS

| | | | |
|---|---|---|---|
| 6,629,027 B2 * | 9/2003 | Yamaguchi et al. | 701/22 |
| 6,661,231 B1 * | 12/2003 | Arai et al. | 324/426 |
| 6,662,096 B2 * | 12/2003 | Komiyama et al. | 701/54 |
| 6,721,637 B2 * | 4/2004 | Abe et al. | 701/22 |
| 6,781,251 B2 * | 8/2004 | Takaoka et al. | 290/40 C |
| 6,847,189 B2 * | 1/2005 | Frank | 320/104 |
| 7,261,672 B2 * | 8/2007 | Frank et al. | 477/45 |
| 7,296,648 B2 * | 11/2007 | Tatara et al. | 180/242 |
| 7,407,462 B2 * | 8/2008 | Tsukada et al. | 477/3 |
| 7,617,895 B2 * | 11/2009 | Lee | 180/65.265 |
| 2003/0141123 A1 * | 7/2003 | Sugiura et al. | 180/65.2 |
| 2004/0060751 A1 * | 4/2004 | Frank | 180/65.2 |
| 2006/0030452 A1 * | 2/2006 | Tsukada et al. | 477/37 |
| 2006/0180363 A1 * | 8/2006 | Uchisasai et al. | 180/65.2 |
| 2007/0052423 A1 * | 3/2007 | Arai | 324/429 |
| 2007/0181354 A1 * | 8/2007 | Andri | 180/65.2 |
| 2007/0204594 A1 * | 9/2007 | Ishii | 60/274 |
| 2009/0044996 A1 * | 2/2009 | Frank | 180/65.29 |
| 2010/0093487 A1 * | 4/2010 | Jerwick | 477/3 |

FOREIGN PATENT DOCUMENTS

| | | |
|---|---|---|
| JP | A-5-124460 | 5/1993 |
| JP | A-2000-110603 | 4/2000 |
| JP | A-2002-221559 | 8/2002 |
| JP | A-2004-50910 | 2/2004 |
| JP | A-2006-46521 | 2/2006 |
| JP | A-2006-94662 | 4/2006 |

\* cited by examiner

VEHICULAR SYSTEM CAPABLE OF SUITABLY CONTROLLING ENGINE SPEED AND GEAR RATIO ACCORDING TO BATTERY CHARGE STATE

CROSS-REFERENCE TO RELATED APPLICATION

This application is based on and claims priority from Japanese Patent Application No. 2007-100082, filed on Apr. 6, 2007, the content of which is hereby incorporated by reference in its entirety into this application.

BACKGROUND OF THE INVENTION

1. Technical Field of the Invention

The present invention relates to a vehicular system that is for use in a motor vehicle, such as a passenger car or a truck, and is configured to control the rotational speed of an engine and the gear ratio of a transmission according to the State of Charge (SOC) of a battery.

2. Description of the Related Art

There is known, for example from Japanese Patent First Publication No. H5-124460, a powertrain control apparatus for use in a motor vehicle. This apparatus is configured so that when the SOC of a battery drops below a predetermined threshold, the apparatus changes the gear ratio of a transmission so as to increase the rotational speed of the engine, and decreases the amount of fuel fed to the engine so as to decrease the output power of the engine. With such a configuration, when the electric power consumption of the vehicle increases, the apparatus can increase the rotational speed of the engine, thereby increasing the amount of the electric power generated by an automotive alternator which charges the battery. As a result, the SOC of the battery can be kept at a high level, thus allowing the battery to have a low capacity and size.

However, with the above configuration, when the power generation torque of the alternator increases with the amount of the electric power generated by the alternator, but the output power of the engine is not suitably decreased, a rapid increase or decrease will be caused in the rotational speed of the engine. As a result, the running performance of the vehicle will be lowered, thus inconveniencing the driver of the vehicle.

Moreover, in recent years, Continuously Variable Transmissions (CVTs) have come to be used in vehicular systems which are not of a hybrid type and employ a general engine. Since the gear ratio of a CVT can be steplessly or continuously changed, it is possible to run an engine connected to the CVT in a low rotational speed region where the efficiency of the engine is high.

Figure 6:
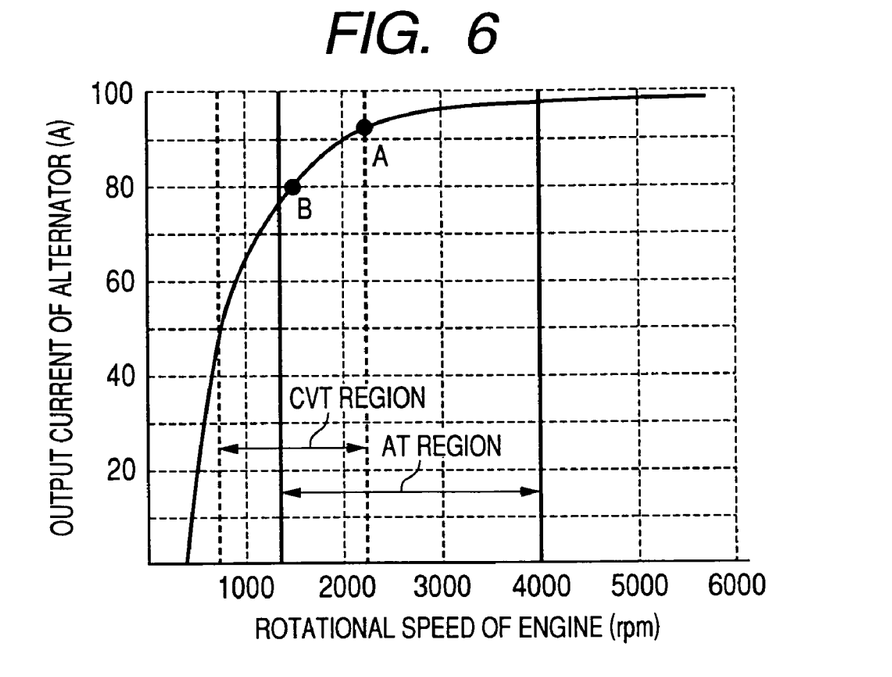
FIG. 6 is a graphical representation illustrating the relationship between the rotational speed of an engine and the output current of an alternator driven by the engine.

However, as shown in FIG. 6, when the rotational speed of the engine decreases, for example from A to B, the output current of an alternator driven by the engine also decreases. As a result, a battery, which is configured to be charged by the alternator, can no longer be charged by the alternator, thus eventually running down. In addition, in FIG. 6, the CVT region denotes the region of the rotational speed of the engine where a CVT can be used; the AT region denotes the region of the rotational speed of the engine where an automatic transmission can be used.

SUMMARY OF THE INVENTION

The present invention has been made in view of the above-mentioned problems.

According to the present invention, there is provided a vehicular system which includes: a battery; an engine; an electric generator that is driven by the engine to generate electric power and thereby charge the battery; a first control apparatus that controls operations of the battery and the electric generator; a drive shaft; a Continuously Variable Transmission (CVT) that transmits rotation of the engine to the drive shaft at a continuously variable gear ratio; and a second control apparatus that controls operations of the engine and the CVT. Further, the first control apparatus includes: means for detecting charge/discharge current of the battery; means for monitoring the State of Charge (SOC) of the battery based on the charge/discharge current detected by the detecting means; means for informing, when there is a decrease in the SOC of the battery monitored by the monitoring means, the second control apparatus of the decrease in the SOC of the battery; means for setting, when there is the decrease in the SOC of the battery, a target charge current of the battery for recovering the decreased SOC of the battery; and means for controlling the electric generator to increase the amount of the electric power generated by the electric generator, thereby supplying the battery with the target charge current set by the setting means.

With the above configuration, when there is a decrease in the SOC of the battery, the first control apparatus informs the second control apparatus of the decrease in the SOC of the battery. Consequently, the second control apparatus can take measures in a timely manner to prevent the battery from running down. Further, the first control apparatus sets the target charge current for recovering the decreased SOC of the battery, and controls the electric generator to increase the amount of the electric power generated by the electric generator, thereby supplying the battery with the set target charge current. Consequently, the power generation torque of the electric generator can be prevented from excessively increasing; thus, any rapid increase or decrease in the rotational speed of the engine can be accordingly prevented. As a result, the running performance of the vehicle can be secured without worrying that the driver of the vehicle is uncomfortable.

According to a further implementation of the invention, the second control apparatus increases, upon being informed of the decrease in the SOC of the battery, both the rotational speed of the engine and the gear ratio of the CVT.

With the above configuration, it is possible to increase the rotational speed of the engine and thus the amount of the electric power generated by the electric generator while keeping both the output power and rotational speed of the drive shaft constant.

Further, the second control apparatus sets both the amount of the increase in the rotational speed of the engine and the amount of the increase in the gear ratio of the CVT in proportion to the amount of the decrease in the SOC of the battery.

With the above configuration, it is possible to suitably change the rotational speed of the engine and the gear ratio of the CVT according to the SOC of the battery, thereby quickly recovering the decreased SOC of the battery.

Preferably, one of the first and second control apparatus may further include means for determining power generation torque of the electric generator; the second control apparatus may correct the set amounts of the increases in the rotational speed of the engine and the gear ratio of the CVT based on the power generation torque determined by the determining means. Further, the determining means may determine the power generation torque of the electric generator based on rotational speed of the electric generator, field current of the electric generator, and output voltage of the electric generator; the setting means may set the target charge current of the battery according to the rotational speed, field current, and output voltage of the electric generator.

Otherwise, one of the first and second control apparatus may preferably further include means for estimating, before the increase in the amount of the electric power generated by the electric generator, the power generation torque of the electric generator after the increase in the amount of the electric power; the second control apparatus may correct the set amounts of the increases in the rotational speed of the engine and the gear ratio of the CVT based on the estimated power generation torque of the electric generator. Further, the estimating means may estimate the value of the power generation torque of the electric generator based on rotational speed of the electric generator, field current of the electric generator, and output voltage of the electric generator; the setting means may set the target charge current of the battery according to the rotational speed, field current, and output voltage of the electric generator.

Moreover, in the vehicular system, the first control apparatus is separated from the second control apparatus and arranged close to the battery.

With the above configuration, it is possible to reduce the process load on the second control apparatus and minimize the total length of wire necessary for electrical connection in the vehicular system.

The first control apparatus further includes means for determining whether the battery is deteriorated; when the battery is determined by the determining means as being deteriorated, the informing means informs the second control apparatus of the deterioration of the battery. Further, the determining means determines whether the battery is deteriorated based on the internal resistance of the battery.

With the above configuration, when the battery is deteriorated, the second control apparatus can be informed of the deterioration of the battery. Consequently, the second control apparatus can increase the rotational speed of the engine to increase the amount of the electric power generated by the electric generator, thereby ensuring sufficient power supply to the electric loads on the vehicle despite the deterioration of the battery.

The vehicular system may further include an engine starter that is powered by the battery. The determining means may detect the internal resistance of the battery based on both the charge/discharge current and a terminal voltage of the battery when the engine is started by the engine starter.

Otherwise, the vehicular system may further include an electric power steering apparatus that is powered by the battery. The determining means may detect the internal resistance of the battery based on both the charge/discharge current and a terminal voltage of the battery when the electric power steering apparatus is in operation.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
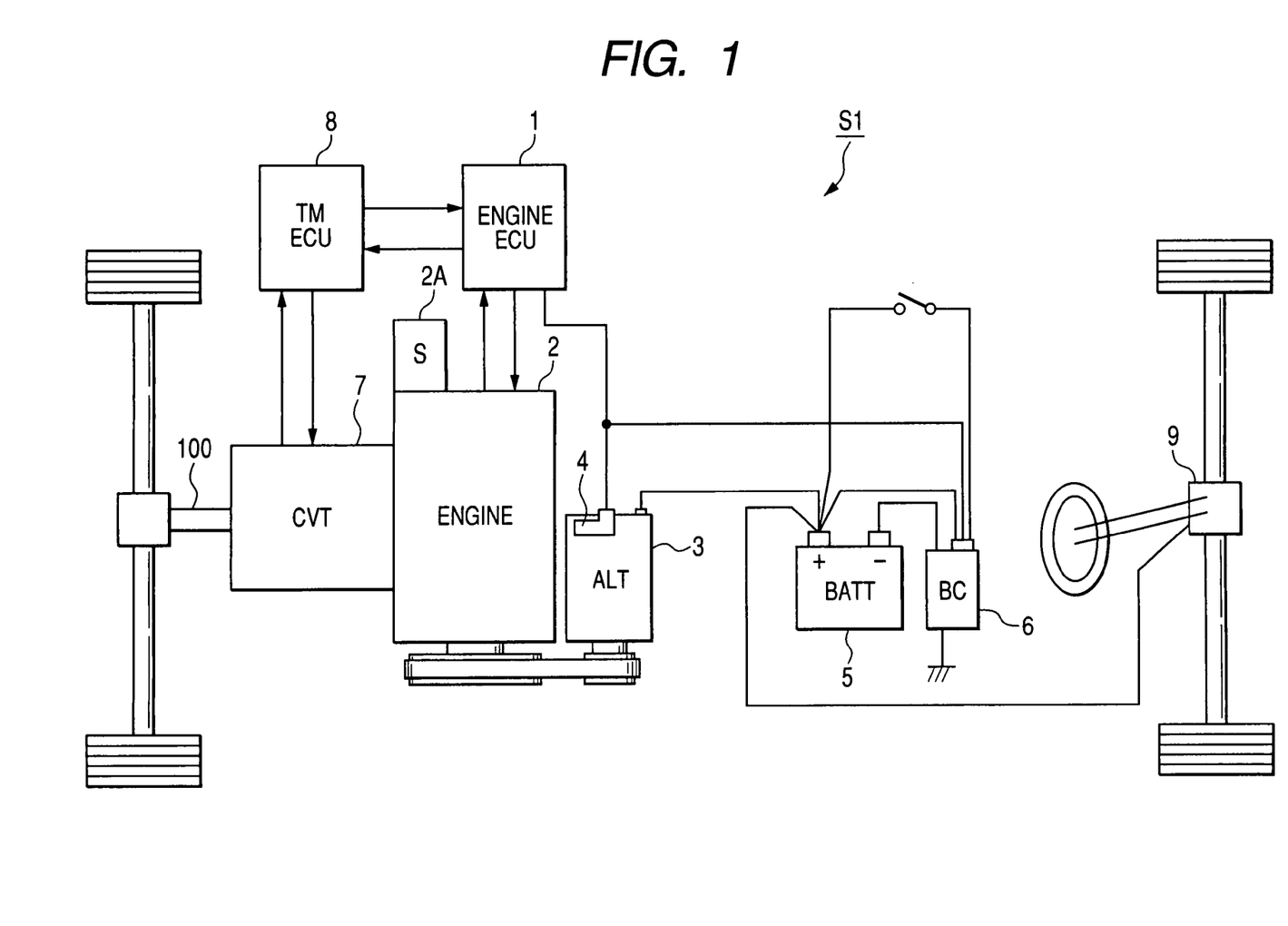
FIG. 1 is a schematic view showing the overall configuration of a vehicular system according to an embodiment of the invention.

FIG. 1 shows the overall configuration of a vehicular system S1 according to an embodiment of the present invention, which is used in a motor vehicle.

As shown FIG. 1, the vehicular system S1 includes an engine ECU (Electronic Control Unit) 1, an internal combustion engine 2, an automotive alternator 3 (denoted by ALT in FIG. 1), a battery 5 (denoted by BATT in FIG. 1), a battery charge/discharge control apparatus 6 (denoted by BC in FIG. 1), a Continuously Variable Transmission (CVT) 7, a transmission ECU 8 (denoted by TM ECU in FIG. 1), an electric power steering apparatus 9, and a drive shaft 100.

The engine ECU 1 controls the operation of the engine 2.

The alternator 3 is driven by the engine 2 via a belt to generate electric power. The generated electric power is used to charge the battery 5 and power various electric loads on the vehicle. The alternator 3 includes a built-in power generation control apparatus 4, which regulates the output voltage of the alternator 3 by controlling, for example, supply of field current to the alternator 3.

The battery charge/discharge control apparatus 6 is arranged in close vicinity to the battery 5 (e.g., fixed to a housing of the battery 5). The apparatus 6 monitors the State of Charge (SOC) of the battery 5 based on the charge/discharge current of the battery 5. When there is a decrease in the monitored SOC of the battery 5, the apparatus 6 informs the engine ECU 1 of the decrease in the SOC, and sets a target charge current of the battery 5 for recovering the decreased SOC. Then, the apparatus 6 controls, in cooperation with the power generation control apparatus 4, the alternator 3 to generate more electric power so as to supply the battery 5 with the target charge current.

The CVT 7 transmits rotation of the engine 2 to the drive shaft 100 at a gear ratio that is continuously variable in a given range. The transmission ECU 8 controls the gear ratio of the CVT 7 which represents the ratio of the rotational speed of the engine 2 to the rotational speed of the drive shaft 100. The electric power steering apparatus 9 includes a motor that is powered by the battery 5 to generate an assist steering torque.

Figure 2:
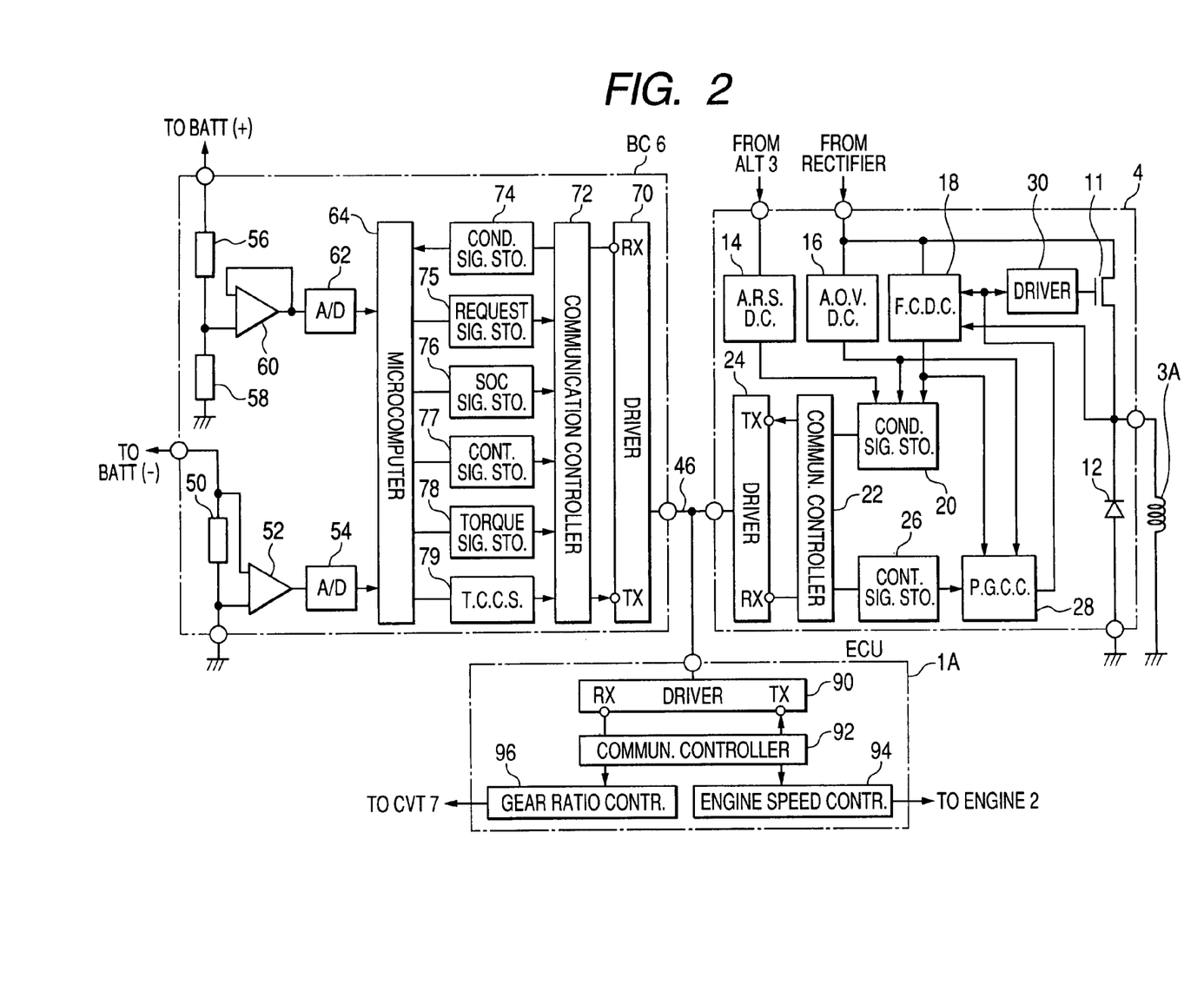
FIG. 2 is a functional block diagram showing the detailed configurations of a power generation control apparatus, a battery charge/discharge control apparatus, an engine ECU, and a transmission ECU of the vehicular system.

FIG. 2 shows the detailed configurations of the power generation control apparatus 4, the battery charge/discharge control apparatus 6, the engine ECU 1, and the transmission ECU 8.

In the present embodiment, the engine ECU 1 and the transmission ECU 8 are integrated into a single ECU 1A that controls operations of both the engine 2 and the CVT 7. On the other hand, the battery charge/discharge control apparatus 6 is separated from the power generation control apparatus 4. However, it should be noted that the engine ECU 1 and the transmission ECU 8 may also be separately provided, and that the battery charge/discharge control apparatus 6 and the power generation control apparatus 4 may also be integrated into a single control apparatus that controls operations of both the alternator 3 and the battery 5.

As shown in FIG. 2, the power generation control apparatus 4 includes a power transistor 11, a free-wheeling diode 12, an alternator rotational speed detection circuit 14 (denoted by A.R.S.D.C. in FIG. 2), an alternator output voltage detecting circuit 16 (denoted by A.O.V.D.C. in FIG. 2), a field current detecting circuit 18 (denoted by F.C.D.C. in FIG. 2), a power generation condition signal storage 20, a communication controller 22, a driver 24, a power generation control signal storage 26, a power generation control circuit 28 (denoted by P.G.C.C. in FIG. 2), and a driver 30.

The power transistor 11 is connected in series with a field winding 3A of the alternator 3, so that the field winding 3A can be supplied with the field current when the power transistor 11 is turned on.

The free-wheeling diode 12 is connected in parallel with the field winding 3A, so that the electric energy stored in the field winding 3A can be removed from the field winding 3A when the power transistor 11 is turned off.

The alternator rotational speed detection circuit 14 detects the rotational speed of the alternator 3. More specifically, in the present embodiment, the circuit 14 checks the frequency of a voltage signal output from one of the three phase windings constituting a stator winding of the alternator 3; then, the circuit 14 determines the rotational speed of the alternator 3 based on the checked frequency of the voltage signal.

The alternator output voltage detecting circuit 16 detects a DC voltage output from a rectifier (not shown) built in the alternator 3 as the output voltage of the alternator 3.

The field current detecting circuit 18 detects the field current flowing through the field winding 3A of the alternator 3. More specifically, in the present embodiment, the circuit 18 monitors the on/off state of the power transistor 11 and computes the field current on the basis of both the on/off state and the output voltage of the alternator 3. Alternatively, the field current may also be detected by: 1) connecting a resistor in series with the power transistor 11; and 2) determining the field current on the basis of the voltage across the resistor when the power transistor 11 is turned on.

The power generation condition signal storage 20 stores a power generation condition signal that represents the rotational speed, output voltage, and field current of the alternator 3, which are respectively detected by the above-described detecting circuits 14, 16, and 18.

The communication controller 22 modulates the power generation condition signal stored in the storage 20 into a predefined digital format.

The driver 24 transmits the modulated power generation condition signal to the battery charge/discharge control apparatus 6 via a communication line 46.

Moreover, the driver 24 also receives a modulated power generation control signal that is transmitted from the battery charge/discharge control apparatus 6 via the communication line 46. The modulated power generation control signal is then demodulated by the communication controller 22 and stored in the power generation control signal storage 26.

The power generation control circuit 28 sends the driver 30 a drive signal for controlling the alternator 3 in accordance with the power generation control signal stored in the storage 26.

In accordance with the drive signal, the driver 30 drives the power transistor 11 so as to regulate the output voltage of the alternator 3 to a target output voltage or regulate the field current of the alternator 3 to a target field current.

The battery charge/discharge control apparatus 6, which communicates with the power generation control apparatus 4 via the communication line 46, includes a shunt resistor 50, amplifiers 52 and 60, A/D converters 54 and 62, resistors 56 and 58, a microcomputer 64, a driver 70, a communication controller 72, a power generation condition signal storage 74, an engine speed request signal storage 75, a SOC signal storage 76, a power generation control signal storage 77, an alternator torque signal storage 78, and a target charge current storage 79 (denoted by T.C.C.S. in FIG. 2).

The shunt resistor 50 is provided to detect the charge/discharge current of the battery 5. The shunt resistor 50 has one end connected to the negative (−) terminal of the battery 5 and the other end grounded. The amplifier 52, which is made up of, for example, a differential amplifier, amplifies the voltage between the ends of the shunt resistor 50. The amplified voltage is converted into digital data by the A/D converter 54; the digital data is then input to the microcomputer 64.

The resistors 56 and 58 together constitute a voltage divider for detecting the terminal voltage of the battery 5. One end of the voltage divider is connected to the positive (+) terminal of the battery 5, and the other end is grounded. The amplifier 60, which is made up of, for example, an operation amplifier, functions as a buffer connected to the output side of the voltage diver. The output voltage of the amplifier 60, which is equal to the voltage at the node between the resistors 56 and 58, is converted into a digital data by the A/D converter 62; the digital data is inputted to the microcomputer 64.

The microcomputer 64 performs the operations of: 1) monitoring the SOC of the battery 5 based on the charge/discharge current of the battery 5; 2) informing, when there is a decrease in the SOC of the battery 5, the ECU 1A of the decrease in the SOC by sending a request signal for increasing the rotational speed of the engine 2; 3) setting, when there is the decrease in the SOC of the battery 5, a target charge current of the battery 5 for recovering the decreased SOC; 4) informing, via the power generation control signal, the power generation control apparatus 4 of the target charge current of the battery 5, thereby instructing the apparatus 4 to control the alternator 3 to supply the battery 5 with the target charge current; 5) determining whether the battery 5 is deteriorated on the basis of the internal resistance of the battery 5 which is detected based either on the charge current and terminal voltage of the battery 5 when the engine 2 is started by a starter 2A (denoted by S in FIG. 1) or on the charge current and terminal voltage of the battery 5 when the electric power steering apparatus 9 is in operation; and 6) informing, when the battery 5 is determined as being deteriorated, the ECU 1A of the deterioration of the battery 5 by sending an informing signal to the ECU 1A. In the present embodiment, the microcomputer 64 performs the above operations by executing a program that is installed in a memory (not shown) of the apparatus 6. However, it is also possible for the microcomputer 64 to perform the above operations by means of dedicated logic circuits.

The driver 70 and communication controller 72 are provided to transmit/receive signals to/from the power generation control apparatus 4 and the ECU 1A; they work almost in the same way as the driver 24 and communication controller 22 of the power generation control apparatus 4. For example, the driver 70 receives the modulated power generation condition signal transmitted from the power generation control apparatus 4 via the communication line 46; the modulated power generation condition signal is then demodulated by the communication controller 72 and stored in the power generation condition signal storage 74.

Moreover, the request signal for increasing the rotational speed of the engine 2 is outputted from the microcomputer 64 and stored in the engine speed request signal storage 75; a battery SOC signal, which indicates the SOC of the battery 5, is output outputted from the microcomputer 64 and stored in the SOC signal storage 76; the power generation control signal is outputted from the microcomputer 64 and stored in the power generation control signal storage 77; an alternator torque signal, which indicates the power generation torque of the alternator 3, is outputted from the microcomputer 64 and stored in the alternator torque signal storage 78; the target charge current is outputted from the microcomputer 64 and stored in the target charge current storage 79. The communication controller 72 modulates those signals stored in the storages 75-79 into predefined digital formats; then, the driver 70 transmits the modulated signals (i.e., digital signals) to either the power generation control apparatus 4 or the ECU 1A.

The ECU 1A includes a driver 90, a communication controller 92, an engine speed controller 94, and a gear ratio controller 96.

The driver 90 and communication controller 92 are provided to transmit/receive signals to/from the battery charge/discharge control apparatus 6; they work almost in the same way as the driver 70 and communication controller 72 of the battery charge/discharge control apparatus 6. For example, the driver 90 receives the modulated request signal for increasing the rotational speed of the engine 2 which is transmitted from the battery charge/discharge control apparatus 6; the modulated request signal is then demodulated by the communication controller 92.

The engine speed controller 94 controls the rotational speed of the engine 2 based on the position of an accelerator of the vehicle. Further, upon receipt of the request signal or the informing signal transmitted from the battery charge/discharge control apparatus 6, the engine speed controller 94 increases the rotational speed of the engine 2.

The gear ratio controller 96 controls the gear ratio of the CVT 7 according to the loaded condition of the engine 2. Further, upon receipt of the request signal or the informing signal transmitted from the battery charge/discharge control apparatus 6, the gear ratio controller 96 increases the gear ratio of the CVT 7.

After having described the overall configuration of the vehicular system S1 according to the present embodiment, operation thereof will be described hereinafter.

Figure 3:
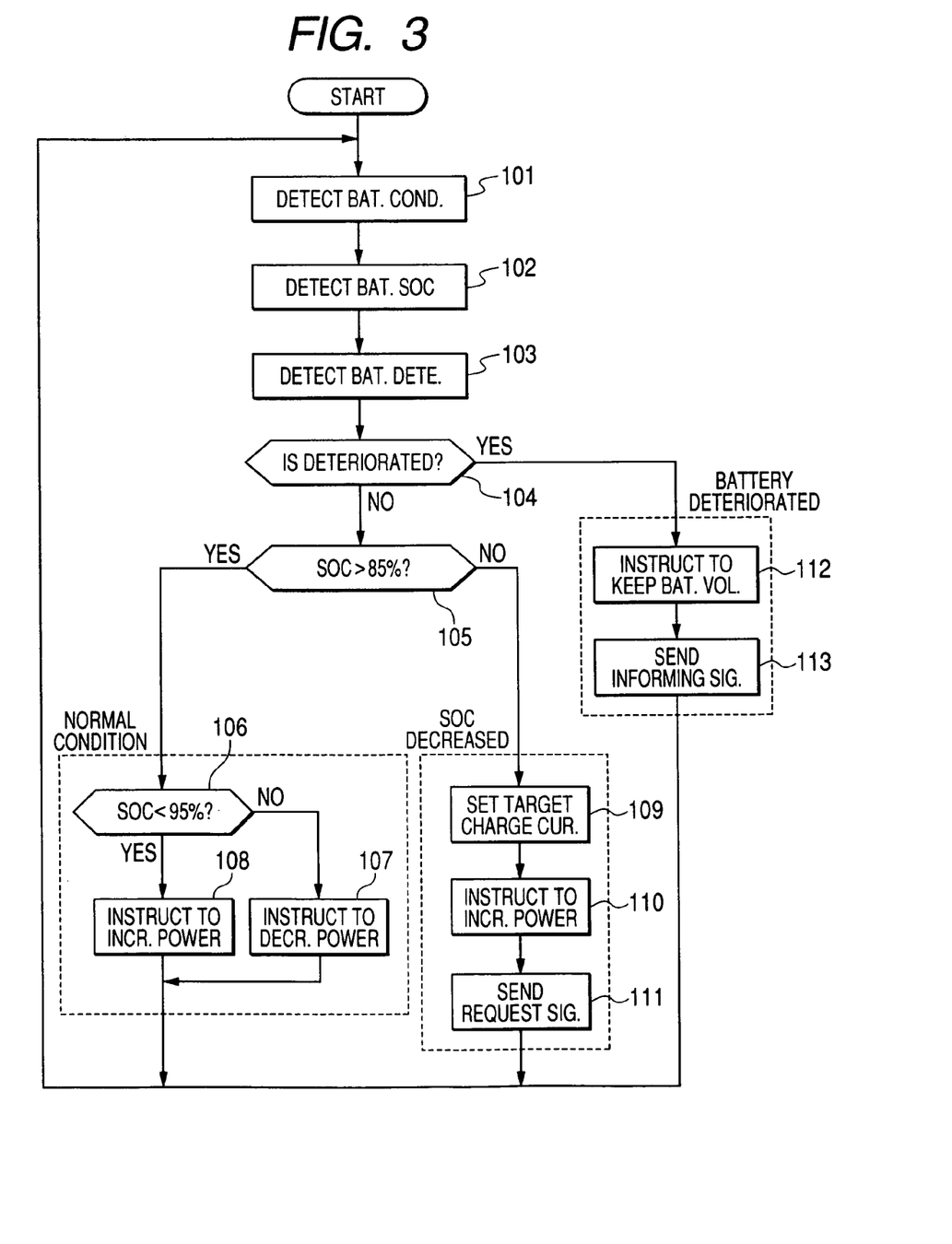
FIG. 3 is a flow chart illustrating a process of a microcomputer of the battery charge/discharge control apparatus.

FIG. 3 shows a process of the microcomputer 64 of the battery charge/discharge control apparatus 6 according to the present embodiment. This process is repeatedly performed at time intervals, for example, not longer than 1/10 of the time constant of the rotor of the alternator 3.

First, at step 101, the microcomputer 64 detects the condition of the battery 5. More specifically, in the present embodiment, the microcomputer 64 detects the charge/discharge current, terminal voltage, and temperature of the battery 5; those parameters together represent the condition of the battery 5. As described previously, the charge/discharge current of the battery 5 is detected based on the digital data output from the A/D converter 54; the terminal voltage of the battery 5 is detected based on the digital data output from the A/D converter 62; the temperature of the battery 5 is detected based on a signal output from a temperature sensor (not shown) that is mounted, for example, to the housing of the battery 5.

At step 102, the microcomputer 64 detects the SOC of the battery 5 by integrating the detected charge/discharge current of the battery 5.

At step 103, the microcomputer 64 detects deterioration of the battery 5 on the basis of the internal resistance of the battery 5. This step may be performed either in parallel with, prior to, or after step 102.

As described previously, the internal resistance of the battery 5 is detected based either on the charge current and terminal voltage of the battery 5 when the engine 2 is started by the starter 2A which is powered by the battery 5 or on the charge current and terminal voltage of the battery 5 when the electric power steering apparatus 9 is in operation. Additionally, step 103 is omitted when the engine 2 has been started and the electric power steering apparatus 9 is at rest.

At step 104, the microcomputer 64 makes a determination as to whether the battery 5 is deteriorated. More specifically, in the present embodiment, the battery 5 is determined as being deteriorated when the internal resistance of the battery 5 is above a reference value, and as being not otherwise.

If the determination at step 104 produces a "NO" answer, then the process proceeds to step 105.

At step 105, the microcomputer 64 determines whether the SOC of the battery 5 is more than 85% of the full capacity of the battery 5.

If the determination at step 105 produces a "YES" answer, then the process proceeds to step 106.

At step 106, the microcomputer 64 further determines whether the SOC of the battery 5 is less than 95% of the full capacity of the battery 5.

If the determination at step 106 produces a "NO" answer, then the process proceeds to step 107. At step 107, the microcomputer 64 instructs the power generation control apparatus 4 to suppress the amount of the electric power generated by the alternator 3. More specifically, in this case, the microcomputer 64 sends the power generation control apparatus 4 the power generation control signal which indicates a target output voltage or a target field current for the alternator 3 to generate less electric power. After that, the process returns to step 101.

On the contrary, if the determination at step 106 produces a "YES" answer, then the process goes on to step 108. At step 108, the microcomputer 64 instructs the power generation control apparatus 4 to increase the amount of the electric power generated by the alternator 3. More specifically, in this case, the microcomputer 64 sends the power generation control apparatus 4 the power generation control signal which indicates a target output voltage or a target field current for the alternator 3 to generate more electric power. After that, the process returns to step 101.

On the other hand, if the determination at step 105 produces a "NO" answer, then the process proceeds to step 109.

At step 109, the microcomputer 64 sets a target charge current of the battery 5 for recovering the SOC of the battery 5.

At step 110, the microcomputer 64 instructs the power generation control apparatus 4 to increase the amount of the electric power generated by the alternator 3, thereby supplying the battery 5 with the target charge current. More specifically, in this case, the microcomputer 64 sends the power generation control apparatus 4 the power generation control signal which also indicates the target charge current.

At step 111, the microcomputer 64 sends the ECU 1A the request signal for increasing the rotational speed of the engine 2. Then, the process returns to step 101.

Moreover, if the battery 5 is deteriorated so that the determination at step 104 produces a "YES" answer, then the process proceeds to step 112.

At step 112, the microcomputer 64 instructs the power generation control apparatus 4 to increase the amount of the electric power generated by the alternator 3, thereby keeping the terminal voltage of the battery 5 within a predetermined range. More specifically, in this case, the deterioration of the battery 5 causes the full capacity of the battery 5 to decrease; therefore, to reliably prevent the battery 5 from running down, the microcomputer 64 sends the power generation control apparatus 4 the power generation control signal which indicates an instruction to keep the terminal voltage of the battery 5 within the predetermined range.

At step 113, the microcomputer 64 sends the informing signal to the ECU 1A, thereby informing the ECU 1A of the deterioration of the battery 5. Then, the process returns to step 101.

Figure 4:
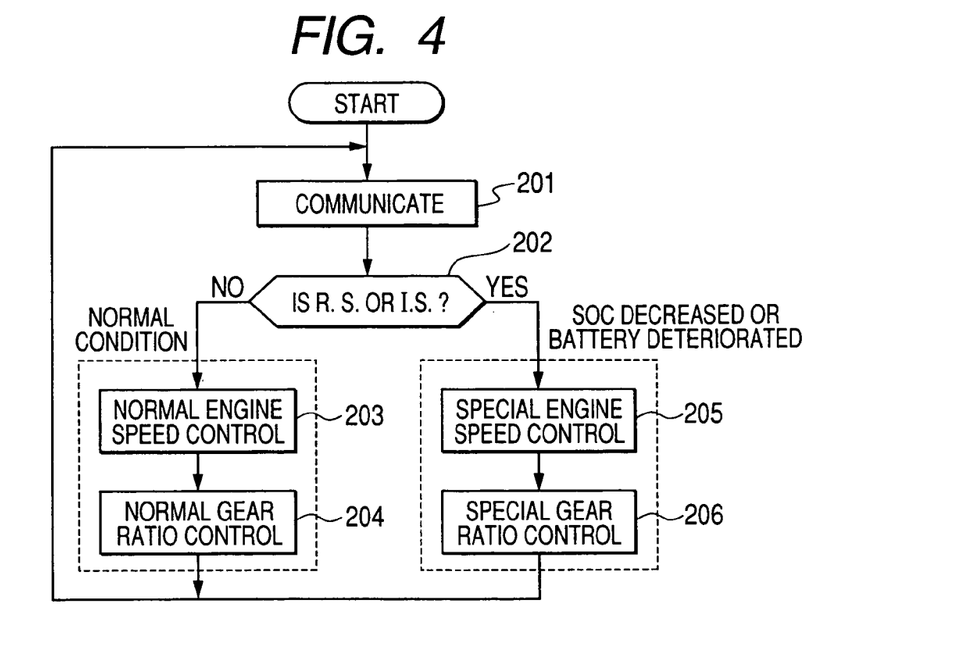
FIG. 4 is a flow chart illustrating a process of an ECU which communicates with the battery charge/discharge control apparatus.

FIG. 4 shows a process of the ECU 1A according to the present embodiment.

First, at step 201, the ECU 1A communicates with the battery charge/discharge control apparatus 6.

At step 202, the engine speed controller 94 and gear ratio controller 96 of the ECU 1A each determine whether the request signal for increasing the rotational speed of the engine 2 (abbreviated to R.S. in FIG. 4) or the informing signal for informing the deterioration of the battery 5 (abbreviated to I.S. in FIG. 4) is received from the battery charge/discharge control apparatus 6.

If the determination at step 202 produces a "NO" answer, then the process proceeds to step 203.

At step 203, the engine speed controller 94 performs normal control on the rotational speed of the engine 2 irrespective of the various operations performed by the battery charge/discharge control apparatus 6.

At step 204, the gear ratio controller 96 performs normal control on the gear ratio of the CVT 7 irrespective of the various operations performed by the battery charge/discharge control apparatus 6. Thereafter, the process returns to step 201.

On the other hand, if the determination at step 202 produces a "YES" answer, then the process proceeds to step 205.

At step 205, the engine speed controller 94 performs special control on the rotational speed of the engine 2. More specifically, the engine speed controller 94 increases the rotational speed of the engine 2 by an amount that is set in proportion to either the amount of the decrease in the SOC of the battery 5 or the degree of the deterioration of the battery 5.

At step 206, the gear ratio controller 96 performs special control on the gear ratio of the CVT 7. More specifically, the gear ratio controller 96 increases the gear ratio of the CVT 7 by an amount that is set proportional to either the amount of the decrease in the SOC of the battery 5 or the degree of the deterioration of the battery 5. Thereafter, the process returns to step 201.

Figure 5:
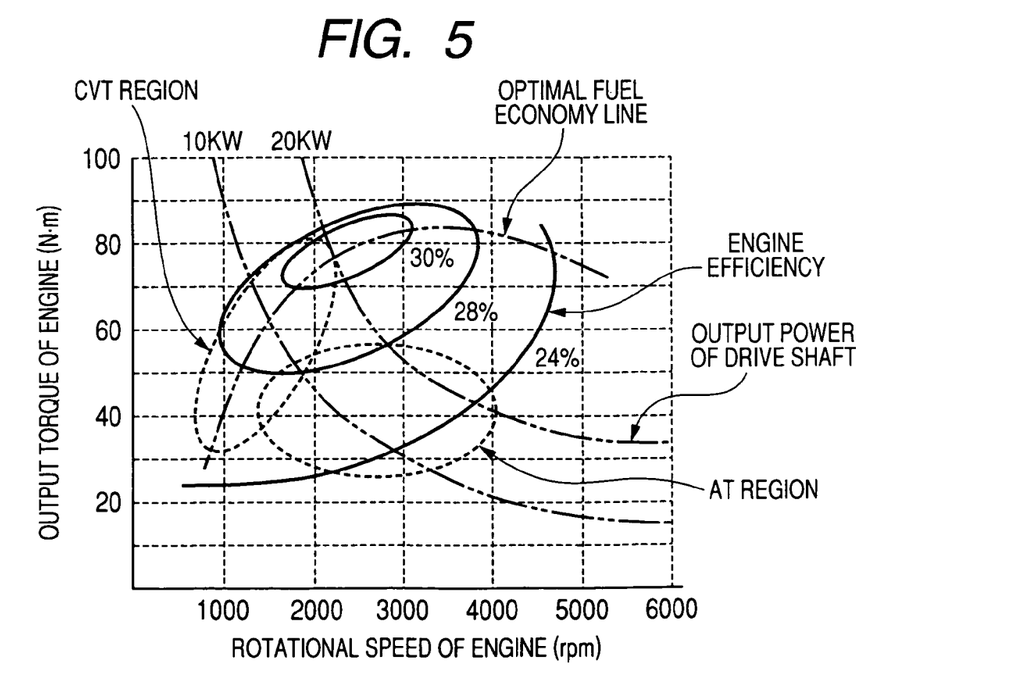
FIG. 5 is a graphical representation illustrating the relationship among the rotational speed of an engine, the output torque of the engine, and the output power of a drive shaft that is driven by the engine via a CVT.

FIG. 5 shows a relationship among the rotational speed of the engine 2, the output torque of the engine 2, and the output power of the drive shaft 100.

In a normal condition, after the necessary output power of the drive shaft 100 is determined, the gear ratio of the CVT 7 is so set as to bring the rotational speed of the engine 2 to a value which corresponds to the intersection between a characteristic line corresponding to the necessary output power of the drive shaft 100 and an optimal fuel economy line. Additionally, in the normal condition, neither the request signal for increasing the rotational speed of the engine 2 nor the informing signal for informing the deterioration of the battery 5 is transmitted from the battery charge/discharge control apparatus 6 to the ECU 1A.

On the other hand, when the request signal for increasing the rotational speed of the engine 2 is transmitted from the battery charge/discharge control apparatus 6 to the ECU 1A, the ECU 1A increases the rotational speed of the engine 2 so as to supply the battery 5 with the target charge current for recovering the SOC of the battery 5 while keeping the output power of the drive shaft 100 constant. For example, as shown in FIG. 6, the amount of the electric power generated by the alternator 3 increases with the rotational speed of the engine 2. In addition, the ECU 1A may repeat the step of increasing the rotational speed of the engine 2 at predetermined time intervals until the battery 5 is supplied with the target charge current.

As above, in the vehicular system S1 according to the present embodiment, the battery charge/discharge control apparatus 6 monitors the SOC of the battery 5; when there is a decrease in the SOC of the battery 5, the apparatus 6 informs the ECU 1A of the decrease in the SOC. Consequently, the ECU 1A can take measures in a timely manner to prevent the battery 5 from running down.

Further, the battery charge/discharge control apparatus 6 sets the target charge current for recovering the decreased SOC of the battery 5; then, the apparatus 6 instructs the power generation control apparatus 4 to control the alternator 3 so as to supply the battery 5 with the set target charge current. Consequently, the power generation torque of the alternator 3 can be prevented from excessively increasing; thus, any rapid increase or decrease in the rotational speed of the engine 2 can be accordingly prevented. As a result, the running performance of the vehicle can be secured without making the driver of the vehicle uncomfortable.

Moreover, in the vehicular system S1, the ECU 1A increases, upon being informed of the decrease in the SOC of the battery 5, both the rotational speed of the engine 2 and the gear ratio of the CVT 7. With this configuration, it is possible to increase the rotational speed of the engine 2 and thus the amount of the electric power generated by the alternator 3 while keeping both the output power and rotational speed of the drive shaft 100 constant.

Further, the ECU 1A increases the rotational speed of the engine 2 and the gear ratio of the CVT 7 by the amounts that are set in proportion to the amount of the decrease in the SOC of the battery 5. With this configuration, it is possible to suitably change the rotational speed of the engine 2 and the gear ratio of the CVT 7 according to the SOC of the battery 5, thereby quickly recovering the decreased SOC of the battery 5.

In the vehicular system S1, the battery charge/discharge control apparatus 6 determines whether the battery 5 is deteriorated; when the battery 5 is determined as being deteriorated, the apparatus 6 informs the ECU 1A of the deterioration of the battery 5. Consequently, the ECU 1A can increase the rotational speed of the engine 2 to increase the amount of the electric power generated by the alternator 3, thereby ensuring sufficient power supply to the electric loads on the vehicle despite the deterioration of the battery 5.

While the above particular embodiment of the present invention has been shown and described, it will be understood by those skilled in the art that various modifications, changes, and improvements may be made without departing from the spirit of the invention.

1) In the previous embodiment, the ECU 1A sets both the amount of the increase in the rotational speed of the engine 2 and the amount of the increase in the gear ratio of the CVT 7 in proportion to the amount of the decrease in the SOC of the battery 5.

However, the ECU 1A may be further configured to: 1) receive the alternator torque signal from the battery charge/discharge control apparatus 6; 2) determine the power generation torque of the alternator 3 based on the received alternator torque signal; and 3) correct the set amounts of the increases in the rotational speed of the engine 2 and the gear ratio of the CVT 7 based on the determined power generation torque of the alternator 3.

Figure 7:
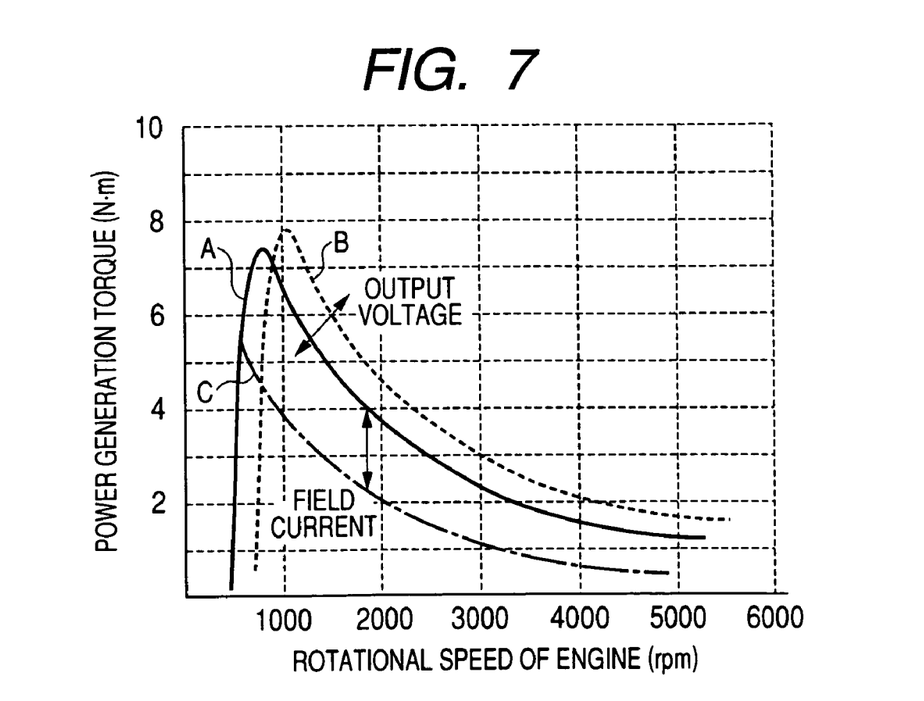
FIG. 7 is a graphical representation illustrating the relationship among the rotational speed of an engine, the power generation torque of an alternator driven by the engine, the output voltage of the alternator, and the field current of the alternator.

FIG. 7 illustrates the relationship among the rotational speed of the engine 2, the power generation torque of the alternator 3, the output voltage of the alternator 3, and the field current of the alternator 3.

As shown in FIG. 7, as the output voltage of the alternator 3 changes, the characteristic curve of the power generation torque of the alternator 3 is shifted, for example, from the curve A to the curve B; as the field current of the alternator 3 changes, the characteristic curve is shifted, for example, from the curve A to the curve C. Therefore, the power generation torque of the alternator 3 can be determined based on the rotational speed of the engine 2 (or the rotational speed of the alternator 3 having a one-to-one relationship with the rotational speed of the engine 2), the output voltage of the alternator 3, and the field current of the alternator 3.

Accordingly, it is possible to store in a memory a map or a table representing the relationship among the four parameters; it is thus also possible for either the microcomputer 64 of the battery charge/discharge control apparatus 6 or the ECU 1A to determine the power generation torque of the alternator 3 based on the map or table stored in the memory.

Consequently, after setting the amount of the increase in the rotational speed of the engine 2, the ECU 1A can determine the power generation torque of the alternator 3 at the newly-increased rotational speed of the engine 2 and set the gear ratio of the CVT 7 by taking into account the determined power generation torque. As a result, it is possible to alleviate both the decrease in the rotational speed of the engine 2 and the variation in the vehicle speed which are caused by the increase in the amount of the electric power generated by the alternator 3.

2) After setting the target charge current, the microcomputer 64 of the battery charge/discharge control apparatus 6 (or the ECU 1A) can determine both the necessary output voltage and field current of the alternator 3 for supplying the target charge current to the battery 5; then, the microcomputer 64 (or the ECU 1A) can further estimate, based on the necessary output voltage and field current of the alternator 3, the power generation torque of the alternator 3 after the increase in the rotational speed of the engine 2. Consequently, the ECU 1A can correct the set amounts of the increases in the rotational speed of the engine 2 and the gear ratio of the CVT 7 based on the estimated power generation torque of the alternator 3. As a result, the rotational speed of the engine 2 can be further stabilized, thus improving the running performance of the vehicle.

3) The microcomputer 64 of the battery charge/discharge control apparatus 6 may set the target charge current of the battery 5 according to the operating condition of the alternator 3 which is represented by the rotational speed, output voltage, and field current of the alternator 3.

What is claimed is:
1. A vehicular system comprising:
a battery;
an engine;
an electric generator that is driven by the engine to generate electric power and thereby charge the battery;
a first control apparatus that controls operations of the battery and the electric generator;
a drive shaft;
a Continuously Variable Transmission (CVT) that transmits rotation of the engine to the drive shaft at a continuously variable gear ratio;
a second control apparatus that controls operations of the engine and the CVT, wherein the first control apparatus is separated from the second control apparatus and arranged close to the battery;
an electric power steering apparatus that is powered by the battery, and
wherein the first control apparatus comprises:
means for detecting a charge/discharge current of the battery;
means for monitoring a State of Charge (SOC) of the battery based on the charge/discharge current detected by the detecting means;
means for determining, when the electric power steering apparatus is in operation, whether the battery is deteriorated, wherein
the determining means detects an internal resistance of the battery based on both the charge/discharge current and a terminal voltage of the battery when the electric power steering apparatus is in operation, and determines whether the battery is deteriorated based on the detected internal resistance of the battery;
means for informing, when there is a decrease in the SOC of the battery monitored by the monitoring means, the second control apparatus of the decrease in the SOC of the battery and informing, when the battery is determined by the determining means as being deteriorated, the second control apparatus of the deterioration of the battery;
means for setting, when there is the decrease in the SOC of the battery, a target charge current of the battery for recovering the decreased SOC of the battery, wherein the setting means sets the target charge current of the battery according to a rotational speed, a field current, and an output voltage of the electric generator; and
means for controlling the electric generator to increase the amount of the electric power generated by the electric generator, thereby supplying the battery with the target charge current set by the setting means when there is the decrease in the SOC of the battery and keeping a terminal voltage of the battery within a predetermined range when the battery is determined by the determining means as being deteriorated,
wherein upon being informed of either the decrease in the SOC of the battery or the deterioration of the battery, the second control apparatus increases both a rotational speed of the engine and the gear ratio of the CVT by amounts that are set based on either an amount of the decrease in the SOC of the battery or a degree of the deterioration of the battery,
one of the first and second control apparatus further comprises:
means for estimating, before the increase in the amount of the electric power generated by the electric generator, a power generation torque of the electric generator after the increase in the amount of the electric power, wherein
the second control apparatus corrects the set amounts of the increases in the rotational speed of the engine and the gear ratio of the CVT based on the estimated power generation torque of the electric generator, and the estimating means estimates the power generation torque of the electric generator based on the rotational speed of the electric generator, the field current of the electric generator, and the output voltage of the electric generator.

2. The vehicular system as set forth in claim 1, wherein the second control apparatus sets both the amount of the increase in the rotational speed of the engine and the amount of the increase in the gear ratio of the CVT in proportion to either the amount of the decrease in the SOC of the battery or the degree of the deterioration of the battery.

* * * * *